United States Patent [19]

Spector et al.

[11] Patent Number: 4,836,960
[45] Date of Patent: Jun. 6, 1989

[54] FABRICATION OF THERMOPLASTIC OPTICAL COMPONENTS BY INJECTION/COMPRESSION MOLDING

[75] Inventors: David P. Spector, Sausalito; Jeffrey M. Kingsbury, Santa Rosa, both of Calif.

[73] Assignee: Sola USA, Inc., Petaluma, Calif.

[21] Appl. No.: 104,235

[22] Filed: Oct. 5, 1987

[51] Int. Cl.$^4$ .............................................. B29D 11/00
[52] U.S. Cl. .................................. 264/2.2; 264/297.3; 264/297.8; 264/328.7; 264/328.8; 264/328.16; 425/547; 425/552; 425/555; 425/808; 425/DIG. 201
[58] Field of Search .................. 264/2.2, 2.7; 425/808, 425/DIG. 108, DIG. 201, 233, 543, 547, 548, 555, 556, 589, 552

[56] References Cited

U.S. PATENT DOCUMENTS

| | | | |
|---|---|---|---|
| 2,424,235 | 7/1947 | Hoffer | 425/808 |
| 4,091,057 | 5/1978 | Weber | 425/808 |
| 4,254,065 | 3/1981 | Ratkowski | 425/808 |
| 4,364,878 | 12/1982 | Laliberte et al. | 264/2.2 |
| 4,540,534 | 9/1985 | Gendol | 264/2.2 |
| 4,569,807 | 2/1986 | Boudet | |
| 4,664,854 | 5/1987 | Bakalar | |

FOREIGN PATENT DOCUMENTS

| | | |
|---|---|---|
| 61619 | 11/1986 | European Pat. Off. |
| 556743 | 10/1943 | United Kingdom |
| 572748 | 10/1945 | United Kingdom |
| 643847 | 9/1950 | United Kingdom |

OTHER PUBLICATIONS

Producing Precision Parts at Injection Speeds, J. Greener, Plastics Engineering, Jun. 87.

Primary Examiner—James Lowe
Attorney, Agent, or Firm—Harris Zimmerman; Howard Cohen

[57] ABSTRACT

A method and apparatus for the fabrication of optical lenses by injection/compression molding of thermoplastic includes a plurality of sleeves, each having a bore therethrough, and a plurality of mold inserts dimensioned to be received in the bore with minimal clearance for sliding fit. The mold inserts each include a precision optical surface adapted to form a front or back surface of a lens. A selected pair of mold inserts are placed in the bore of a sleeve with front and back surface forming optical surfaces in confronting relationship to define a mold cavity, and the assembly is heated to a temperature above the glass transition temperature of the thermoplastic to be molded. An injection port extends through the sleeve to the bore, and is positioned to inject thermoplastic that has been heated to a fluid state into the cavity. After injection of the thermoplastic, the mold inserts are compressed together, and excess thermoplastic is forced out of the mold cavity. The mold inserts are then translated together relative to the sleeve to uncouple the injection port from the cavity. Compressive pressure is then maintained on the mold inserts while the mold assembly is cooled below the glass transition temperature. The mold inserts are pulled from the sleeve, and the finished lens is removed.

28 Claims, 4 Drawing Sheets

FIG_6

FABRICATION OF THERMOPLASTIC OPTICAL COMPONENTS BY INJECTION/COMPRESSION MOLDING

BACKGROUND OF THE INVENTION

In the manufacture of ophthalmic lenses, the use of optical quality glass has been supplanted in recent years by plastic materials. Although plastic materials offer the potential of easier fabrication and the elimination of at least some of the grinding and polishing steps required to form a glass lens, this potential has not been fully exploited by prior art techniques.

Indeed, the majority of plastic ophthalmic lenses are produced today by grinding and polishing to prescription. Another large segment of the lens market is filled by so-called "stock" lenses, i.e., lenses manufactured to final power but not edged. In the grinding method considerable time and labor is required to fashion the finished optical surface or surfaces. The stock lenses are generally formed either by grinding and polishing, or by casting with thermosetting materials, and either approach is a lengthy and labor intensive process. In addition, the casting process requires a rather long curing time, during which the molds that form the lens surfaces are tied up. Thus a lens casting manufacturing facility requires a large number of molds, and the molds comprise a large capital investment.

Plastic fabrication techniques such as injection molding or compression molding offer the advantage of far quicker component production per mold, but these processes have intrinsic drawbacks which present difficulties in the formation of high quality optical lenses. Generally speaking, in injection molding a heated, liquid thermoplastic material is injected under high pressure into a mold cavity that is held at a temperature substantially below the solidification temperature of the plastic. Solidification occurs unevenly as the material cools, and dimensional variations and shrinking from the mold surfaces creates poor lenses. Injection molding machines are generally adapted to produce batches of identical items at a fairly high rate, and changing of the molds to produce differing items is time consuming and expensive.

Compression molding has been used to fabricate plastic lenses, generally using a preformed blank which is compressed in a heated, softened state between two molds to form a finished lens. A clear disadvantage of this approach is that the preformed blank must undergo more than one heating and cooling step, thereby requiring a large energy input. Furthermore, finished lenses vary in the volume of material incorporated therein, due to the variations in prescriptions, and it is extremely difficult to provide preformed blanks that provide the required amount of plastic material. Thus control of the thickness of the finished lens is problematic in compression molding of lenses.

There are known in the prior art attempts to combine injection molding and compression molding techniques to elicit the best characteristics of both approaches. Generally speaking, these attempts have not provided sufficient productivity to justify the expensive and complex machines required to undertake the combined processes. It has also been difficult to eliminate the flash and sprues that accompany plastic molding, necessitating manual intervention and cleaning procedures. This drawback is contrary to the goal of automated production of finishes ophthalmic lenses.

SUMMARY OF THE PRESENT INVENTION

The present invention generally comprises a method and apparatus for the production of finished ophthalmic lenses, each finished lens having the desired optical characteristics to fill a prescription and requiring no further grinding or polishing. A salient feature of the invention is that it is adapted to produce lenses serially in rapid fashion, the lens having either the same or differing spherical power, cylindrical power, and the like. Another important feature is that it employs interchangeable molding dies to form the lens surfaces, so that an ophthalmic lens to fill virtually any prescription may be produced with relative ease. A further aspect of the invention is that it combines the attributes of injection molding, such as production speed and throughput, with the attributes of compression molding, such as precision replication and low residual stresses in the finished lens.

The apparatus for the fabrication of optical lenses by injection/compression molding of thermoplastic includes a plurality of sleeves, each having a bore therethrough, and a plurality of mold inserts dimensioned to be received in the bore with minimal clearance for sliding fit. The mold inserts each include a precision optical surface adapted to form either a front or back surface of a lens. A pair of mold inserts are selected to provide the desired optical surfaces to fill a particular prescription, and are placed in the bore of a sleeve with front and back surface forming optical surfaces in confronting relationship to define a mold cavity. The assembly is heated to a temperature above the glass transition temperature of the thermoplastic to be molded.

The sleeve includes an injection port extending therethrough to the bore, and is positioned to inject thermoplastic that has been heated to a fluid state into the cavity. After injection of the thermoplastic, the mold inserts are compressed together by hydraulic or pneumatic means or the like, and excess thermoplastic is forced out of the mold cavity through the injection port. The mold inserts are then translated together relative to the sleeve to uncouple the injection port from the cavity. Compressive pressure is then maintained on the mold inserts while the mold assembly is cooled below the glass transition temperature, so that shrinkage of the plastic material is accommodated and residual stresses are minimized. The mold inserts are pulled from the sleeve, and the finished lens is removed.

It should be noted that the apparatus of the invention is well adapted to a closed loop manufacturing cycle in which a large plurality of the moldsleeve assemblies are filled and volumetrically trimmed at an injection station in serial fashion, and the assemblies undergo the cooling-compression stages while separated from the injection station. Thus a large number of mold-sleeve assemblies may be used in active production simultaneously, thereby maximizing the productive use of the relatively expensive mold dies and the injection station inself. Furthermore, the interchangeability of the mold dies enables the production of virtually any prescriptive ophthalmic lens in final form, with little or no manual finishing required. Also, the majority of the mold dies and the sleeve members undergo thermal cycling in a relatively narrow temperature range centered about the glass transition temperature of the thermoplastic, so that energy consumption is minimized.

DESCRIPTION OF THE PREFERRED EMBODIMENT

The present invention generally comprises a method and apparatus for the fabrication of ophthalmic lenses and the like, and in particular for the fabrication of finished lenses to fill the requirements of virtually the entire range of ophthalmic lenses. The invention is directed toward the use of thermoplastic materials, such as, for example, polycarbonates, methacrylates such as polymethyl methacrylate, styrene, thermoplastic acrylic, polysulfone, and the like.

One aspect of the present invention is the provision of a combined injection/compression molding process to produced ophthalmic lenses in finished form. With reference to FIGS. 1-5, in which this process is depicted schematically, a sleeve 21 is provided, with a cylindrical bore 22 extending therethrough. An injection port 24 extends through the sleeve wall to the bore thereof, the exterior end of the port 24 being dimensioned and adapted to releasably engage an injector nipple 26 of a typical screw injector known in the prior art. The bore 22 is also provided with an annular groove 23 spaced axially from the injection port 24, for purposes to be explained below.

A pair of molding dies 27 and 28 are also provided, the dies having cylindrical outer surfaces dimensioned to be received in the bore 22 with minimal clearance for sliding translation in the bore. Die 27 is provided with a concave precision optical surface 29, and die 28 is provided with a convex precision optical surface 30. The confronting die surfaces define a closed molding cavity 31, together with the bore wall of the sleeve. It is significant to note that, due to the translatability of the mold dies in the bore, the cavity 31 itself may be translated axially in the bore.

Figure 1:
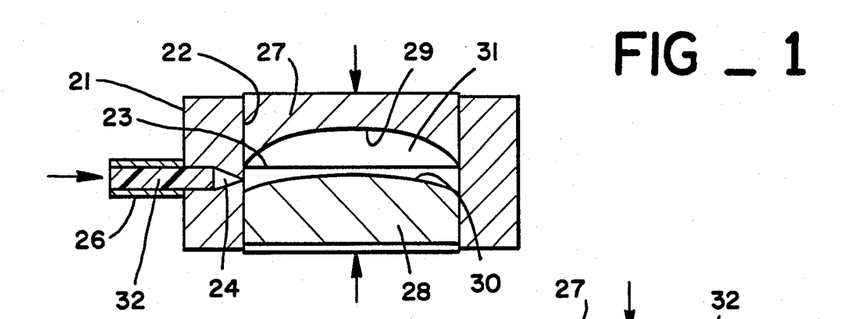
FIGS. 1-5 are a sequence of schematic representations of the moldsleeve assemblies of the present invention, showing the steps in the method of lens production of the present invention.

The mold dies 27 and 28 are initially heated to a temperature slightly above the glass transition temperature of the thermoplastic material being fabricated. In the example of polycarbonate, the glass transition temperature $T_g$ is approximately 300° F., and the dies are heated to approximately 400° F. The sleeve 21 is also heated to a temperature approximately 50° F. cooler than the dies, so that as the process described below is carried out, plastic material will cool and solidify at the outer annular boundary of the cavity 31, and will not extrude into the narrow annular clearance space between the dies and the bore 22. In the initial stages of the process, the heated dies are assembled in the bore of the heated sleeve 21, and the injector nipple 26 is engaged wtih the injector port 24. Thermoplastic material 32 heated to a viscous, flowable state is then injected under high pressure into the mold cavity 31 to fill the entire cavity.

Figures 2, 3:
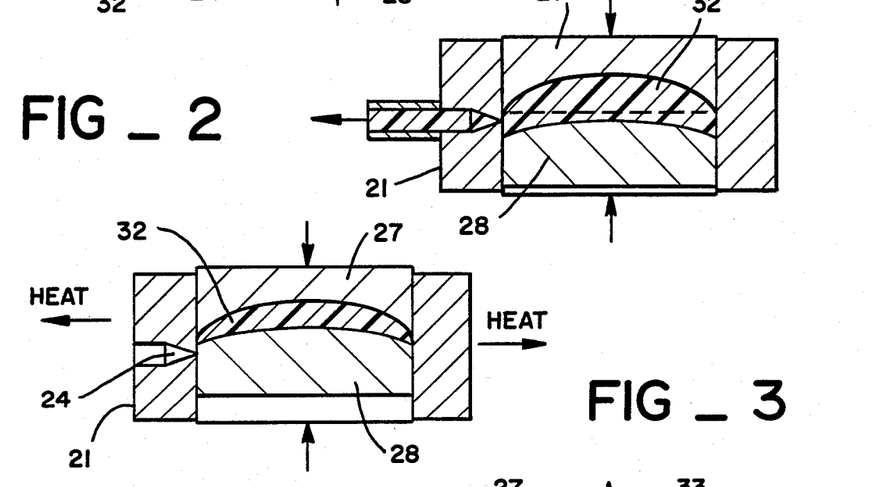

Following plastic melt injection, the dies are translated together relative to each other. This step acts to reduce the thickness of the cavity to a desired dimension of the finished lens, and also to squeeze the thermoplastic material in the mold cavity so that excess material is driven from the cavity out through the injector port, as shown in FIG. 2. It may be appreciated that the process is thus self-adjusting in the volume of plastic melt material consumed, so that.plastic is not wasted in the process. Thereafter the mold dies 27 and 28 are translated conjointly axially in the bore relative to the sleeve (or vice versa), so that the mold cavity is effectively translated in the bore. This action has the effect of uncoupling the mold cavity 31 from the injector port 24, as shown in FIG. 3, thereby sealing the mold cavity and preventing further ejection of plastic material from the mold cavity. The cavity 31 is shifted axially so that it is positioned to register with and incorporate the annular groove 23 therein, and the pressurized plastic melt will flow into the groove 23. At this stage the injector nipple 26 may be disengaged from the injector port 24.

Thereafter compressive pressure is applied to the dies. This compressive pressure is within the range of approximately 500-10,000 psi, and a pressure of 1000 psi is typical. The assembled mold dies and sleeve are then cooled, either passively by conduction and radiation, or by active cooling means such as cool air jets, conduction heat sinks, or the like.

As the assembly cools, the thermoplastic material loses heat and cools below the glass transition temperature, forming a solid lens. The material undergoes shrinkage due to thermal contraction and possibly phase contraction, and tends to pull away from the die surfaces and create high stress areas in the material. However, due to the presence of the relatively high compression force applied to the material by the impinging dies, the plastic material cannot pull away from the cavity surfaces, and the resulting lens formed from the plastic material bears a surface conformation that is a precise complementary replication of the mold surfaces 29 and 30. Furthermore, the high compression pressure combined with a relatively slow cooling rate permits flow of the plastic material as it solidifies. The residual stresses due to dimensional changes as the material cools are substantially alleviated by the compression force, and the residual stresses and birefringence in the finished part are quite low. Thus the lens product of the invention is a high quality lens with high strength and optical clarity.

Figures 4, 5:
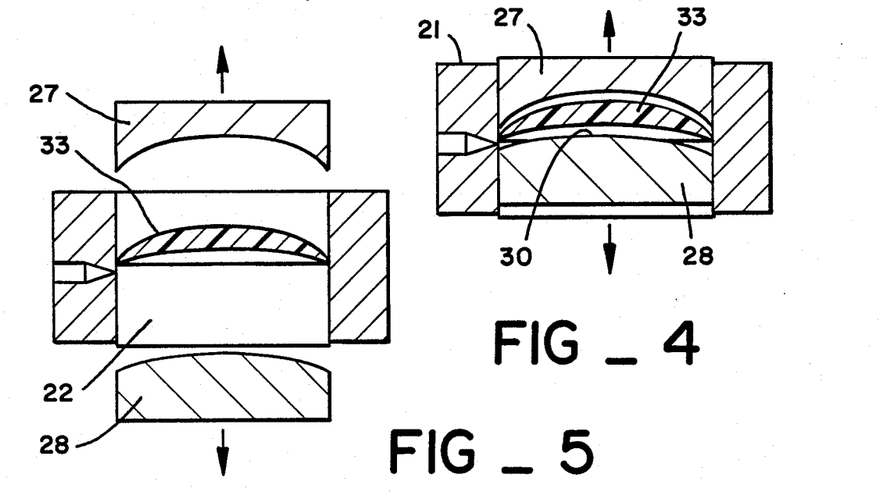

After the mold assembly cools the thermoplastic below $T_g$, and the plastic solidifies into a lens 33, the compressive force is removed from the mold dies 27 and 28. A tensile force is then applied to separate the dies axially and pull the dies from the bore 22. Due to the fact that the lens 33 extends into the annular groove 23, the lens 33 is retained at the location of its formation while the dies are separated from the lens and translated divergently outwardly from the bore. As the sleeve 21 and the lens 33 cool further, the thermal expansion of the bore and the contraction of the lens will cause the release of the lens from the annular groove 23, and the lens may easily be removed from the bore.

An important aspect of the present invention is that a large number of mold dies 27 and 28 and sleeve components 21 may be employed in a highly automated process to produce finished optical lenses or the like. With regard to FIG. 11, in this aspect of the invention a mold inventory 41 is maintained, with a sufficient number of molds of differing optical surfaceforming contours to generate substantially all of the prescriptive ophthalmic lenses required by the general public. In this regard, the molds 27 may be provided with surfaces 29 having various spherical power corrections extending throughout the range of normal corrective requirements, and the molds 28 may be provided with surfaces 30 having cylindrical power corrections extending throughout the range of normal astigmatism corrective requirements. Thus by selecting the appropriate mold dies 27 and 28, a lens may be produced which fulfills the prescription requirements of virtually any single vision ophthalmic lens. The mold dies may also be provided with multifocal segment-forming portions to generate multivision lenses.

Figure 11:
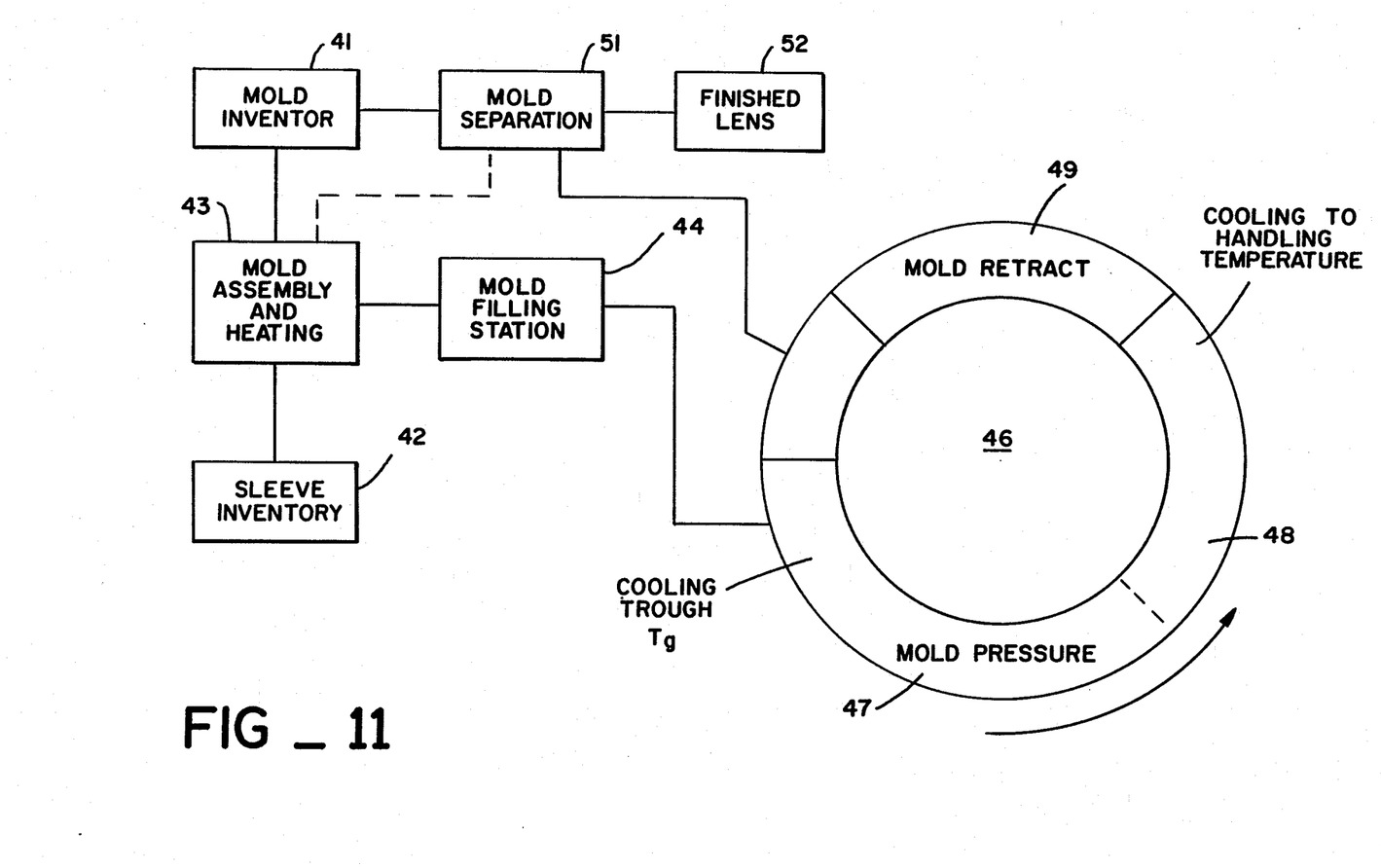
FIG. 11 is a block diagram flow chart of an automated form of the lens manufacturing process of the present invention.

The manufacturing process also provides an inventory 42 of sleeve members 21, all of the sleeve members being substantially identical. The sleeve members may vary only in that sets of sleeves of differing diameters may be required to produce lenses of preferred, differing diameters. To produce a lens which fills a particular prescriptive need, the appropriate mold dies 27 and 28 are selected from the inventory 41, and assembled in the bore of an appropriate sleeve member 21 from the inventory 42 at a mold assembly station 43. The station 43 is also provided with a mold assembly heating device, such as a controlled temperature oven, to heat at least the mold dies and preferably the entire assemblies to a temperature above the glass forming temperature of the thermoplastic material. The heated mold assemblies are then transferred directly to a mold filling station 44.

At the mold filling station 44 the procedures described with reference to FIGS. 1-3 are carried out; i.e., the mold assemblies are filled, squeezed to eject excess plastic material, and relatively translated to disconnect the mold cavity of each assembly from its respective injector port. These procedures, although lengthy in description, can be carried out in a few seconds, and the heated mold assemblies retain sufficient heat to maintain a temperature above the solidification temperature of the thermoplastic material.

The filled mold assemblies are then transferred from the mold filling station 44 to a device 46 which carries out the steps of maintaining pressure on the mold dies while the assemblies are cooled below $T_g$. In FIG. 11 the device 46 is depicted as a circular, rotating member, and indeed a rotary table is used in the preferred embodiment. In section 47 of the rotary table, mold pressure is maintained by either one of a plurality of hydraulic or pneumatic devices, or by mechanical means such as screw jacks or clamps, springs, or any mechanical equivalent known in the prior art. In portion 47 of the device 46 the lenses 33 are realized, after a cooling period of approximately ten minutes. The mold assemblies then pass to portion 48 of the device 46, where further cooling to handling temperature takes place, and to portion 49, where the mold dies are retracted as shown in FIG. 4. The mold assemblies are separated at station 51, and the finished lenses are collected and labelled at station 52. The mold dies are either returned to the inventory 41, or are immediately reused at the assembly station 43, and the sleeves likewise may be returned to the inventory 42 or preferably reused immediately to make use of the residual heat therein.

Figures 7, 8, 9:
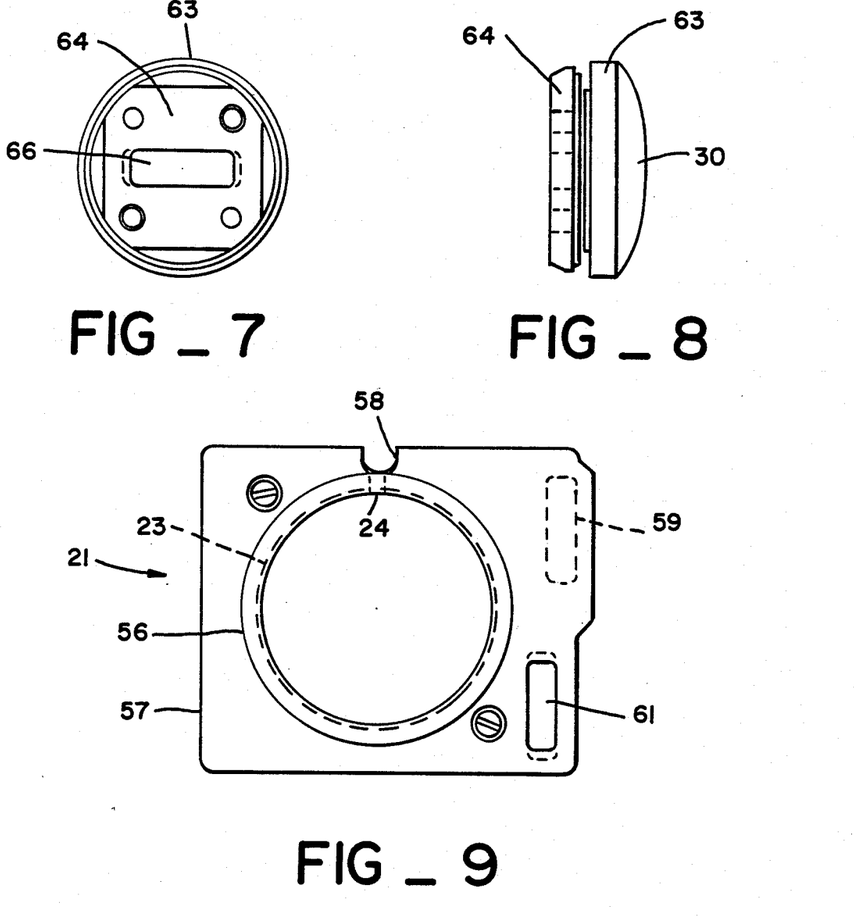
FIG. 7 is a bottom view of an optical surface-forming mold die of the present invention.
FIG. 8 is a side elevation of the mold die depicted in FIG. 7.
FIG. 9 is a plan view of the sleeve component of the apparatus of the present invention.
Figure 10:
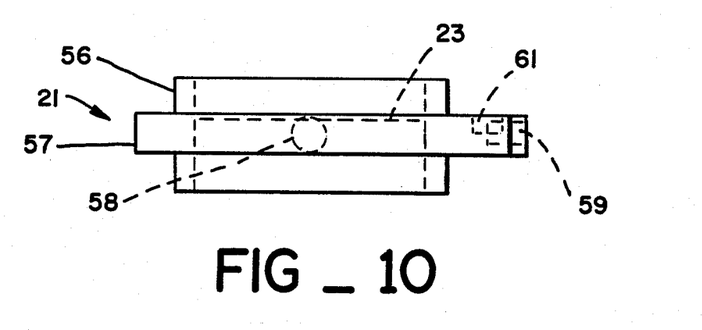
FIG. 10 is a side elevation of the sleeve component shown in FIG. 9.

A preferred embodiment of the sleeve component 21, shown in FIGS. 9 and 10, includes a generally cylindrical wall 56 having the bore 22 extending axially therethrough, and the lens locator groove 23 inscribed in the bore 22. A flange 57 extends outwardly from a medial portion of the cylindrical wall 56. The flange 57 is provided with a notch 58 communicating with the injector port 24 to receive and engage the nipple of a plastic melt injector device. The flange 57 further includes a slot 59 extending into one edge thereof and dimensioned to be engaged by the caliper grippers commonly provided with robotic manufacturing tools. A similar slot 61 is provided in one lateral surface of the flange 57, also to facilitate robot handling of the sleeve component.

A preferred embodiment of the mold dies 27 and 28, shown in FIGS. 7 and 8, is depicted with a convex optical surface-forming contour 30, as in die 28, although it may be appreciated that the mold die 27 differs only in the provision of a concave surface 27. The optical surface-forming contours may be fashioned of a glass blank using lens forming techniques, or may comprise replicas of such surfaces formed by electrodeposition techniques known in the prior art. In either instance the blank 63 is provided with a cylindrical outer surface having a diameter slightly less than the diameter of the bore 22, so that the dies may be slidably received in the bore with insufficient space therebetween to permit plastic flow out of the mold cavity 31. The blank 63 is joined to a backing plate 64 having a diameter slightly less than the blank itself. The backing plate is also provided with a slot 66 adapted to be engaged by robot caliper grippers.

It may be appreciated that the mold dies and the sleeve components are well adapted to be handled and assembled by robotic means, so that the method described above can be automated to a great extent. Furthermore, the slots 66, 59, and 61 are provided with bar code labels or other machine readable indicia which specify the identity and diameter of the sleeve component, the power of the lens forming surface, etc, so that a computerized control system may be applied to direct the robot machines handling the mold dies and sleeve components.

Figure 6:
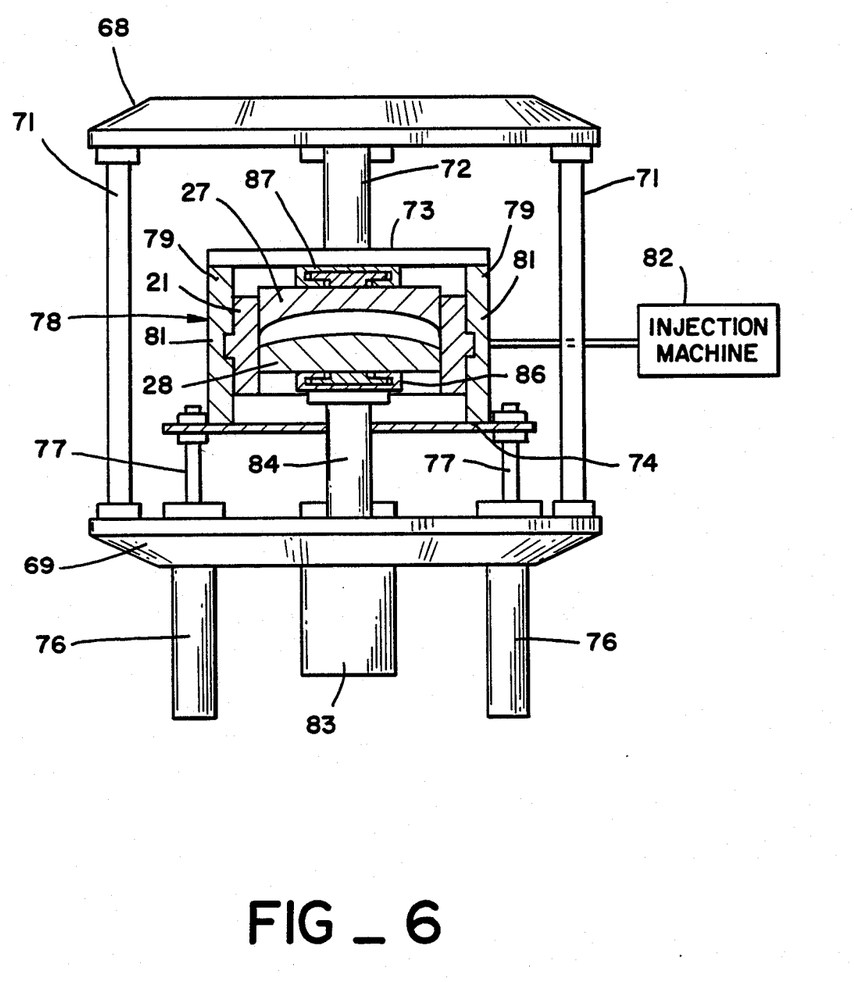
FIG. 6 is a partially cutaway elevation of a portion of the apparatus of the present invention for carrying out the process steps represented in FIGS. 1-5.

Another salient aspect of the present invention is the construction of the preferred embodiment of the mold filling station 44, as depicted in FIG. 6. The mold filling station is generally described as a compound hydraulic press having a top plate 68 and bottom plate 69 joined in fixed, spaced relationship by a plurality of support columns 71. A support column 72 extending from a medial portion of the member 68 supports a stop plate 73 in fixed, spaced relationship from the plate 68. A support member 74 is disposed medially between the members 68 and 69, and adapted for limited translational motion therebetween. A pair of hydraulic cylinders 76 are secured to the bottom plate 69 in laterally spaced fashion, with the piston rods 77 of the hydraulic cylinders extending to and joined with the support member 74 to selectively translate the member 74 as will be explained in the following description.

Joined to the support member 74 is a sleeve support bracket 78. The bracket 78 includes upwardly extending side walls 79 spaced sufficiently to receive therebetween a sleeve component 21 described previously and shown in FIG. 9. The side walls 79 are provided with confronting, aligned slots 81 dimensioned to receive and engage the flange 57 of the sleeve component, so that the sleeve component may be slidably inserted into and removed from the bracket 78, either by manual or robotic means. A thermoplastic screw injector machine 82 is connected by flexible coupling means through the bracket side wall 79 to communicate with the notch 58 and injector port 24 of the sleeve component.

Also joined to the bottom plate 69 is a hydraulic cylinder 83, disposed medially in the bottom plate with the the piston rod 84 thereof extending upwardly. The piston rod 84 extends through an opening in the member 74, and includes a collet or similar gripping means 86 at the upper end thereof dimensioned and oriented to engage the backing plate 64 of the die 28 in slidable fashion. Likewise, the lower end of the column 72 is provided with a collet or similar gripping means 87 to engage the backing plate 64 of the die 27. Thus it may be appreciated that the hydraulic pistons 77 and 84 may be positioned so that as the sleeve component 21 is inserted into the bracket 78, the backing plates 64 of the dies assembled to the sleeve component are engageable by the collets (or grippers) 86 and 87.

When the sleeve component and assembled dies are thus engaged in the apparatus of FIG. 6, injector machine 82 is actuated to fill the mold cavity 31 with viscous, fluid thermoplastic material, as described previously, and the hydraulic piston 84 may then be actuated to urge the die 28 toward the die 27. The pressure applied by piston 84 sufficient so that excess plastic material is ejected from the cavity and ejected back into the injector machine, as decribed previously with reference to FIG. 2. The hydraulic pistons 77 are then actuated to retract, thus translating the members 74 and 79 and the sleeve component 21 relative to the dies 27 and 28, as described previously with reference to FIG. 3. This step disconnects the mold cavity from the injector machine 82, and effectively seals the mold cavity. The sleeve component and its assembled dies may then be slidably withdrawn from the bracket 78 and the channel members 86 and 87, and transferred to the device 47 for application of continued compressive force and cooling of the assembly to produce a lens 33.

It may be appreciated that the present invention has been described with regard to fabrication of ophthalmic lens in particular, using thermoplastic material. However, the process and apparatus described herein may be applied to production of other high precision plastic parts, using other materials of choice.

We claim:

1. A method for molding a component in a molding cavity defined by a pair of axially spaced molds slidably mounted within a sleeve, which comprises the steps of spacing the molds to define a cavity having a volume in excess of that required to form the finished component, filling the cavity with a polymeric molding material at a temperature of the same order as the molds defining the molding cavity by extrusion through an inlet passage in said sleeve, at least the molds having been heated to a temperature above, but relatively close to, the glass transition temperature of the molding material, moving one or both molds to reduce the volume of the cavity to the desired size of the component plus any allowance for thermal shrinkage thereby compressing the molding material within the cavity and causing any excess molding material to be extruded out of the mold cavity, applying pressure to the molten material through one or both of the molds to form the component under conditions where shrinkage is accommodated while gradually cooling the molds, the sleeve and the component through the glass transition temperature, and removing the molds and the component from the sleeve.

2. The method of claim 1, further including the step of providing an annular groove within the sleeve and positioned to be in registration with the component as it cools below the glass transition temperature, whereby a peripheral portion of said component extends into said groove and retains the component in the groove.

3. The method of claim 1, wherein said polymeric molding material comprises a thermoplastic molding material injected through said inlet passage at relatively high pressure.

4. The method of claim 1, further including the step of moving the molds and molten material filling the cavity relative to the sleeve to disconnect the molten component and the cavity from the inlet passage.

5. A method for molding a lens in a molding cavity defined by a pair of axially spaced molds slidably mounted within a sleeve, which comprises the steps of spacing the molds to define a cavity having a volume in excess of that required to form the finished lens, filling the cavity with a polymeric molding material at a temperature of the same order as the molds defining the molding cavity by extrusion through an inlet passage in said sleeve, at least the molds having been heated to a temperature above, but relatively close to, the glass transition temperature of the molding material, moving one or both molds to reduce the volume of the cavity to the desired size of the lens plus any allowance for thermal shrinkage thereby compressing the molding material within the cavity and causing any excess molding material to be extruded out of the mold cavity, applying pressure to the molten material through one or both of the molds to form the lens under conditions where shrinkage is accommodated while gradually cooling the molds, the sleeve and the lens through the glass transition temperature, and removing the molds and the lens from the sleeve.

6. The method of claim 5, further including the step of providing an annular groove within each of the sleeves and positioned to be in registration with each lens therein as it cools below the glass transition temperature, whereby a peripheral portion of each lens extends into said groove and retains the lens in the groove as the molds are withdrawn from the sleeve.

7. The method of claim 5, further including providing a plurality of front surface and back surface molds, each having a respective molding surface contoured and finished to form a complementary front surface or back surface of the lens, providing a plurality of sleeves, and selecting particular front surface and back surface molds according to their molding surface contours to define finished lenses having predetermined ophthalmic corrections.

8. The method of claim 7, wherein said polymeric molding material comprises a thermoplastic molding material injected through the inlet passage of each sleeve at relatively high pressure.

9. The method of claim 7, further including the step of moving the molds and molten material filling the cavity relative to the respective sleeve to disconnect the molten lens and the cavity from the inlet passage of the sleeve.

10. An apparatus for molding finished ophthalmic lenses, comprising a plurality of molding assemblies, each molding assembly including a sleeve member having a bore extending therein, a pair of mold dies having contoured molding surfaces adapted to form complementary front and back surfaces of a lens, said dies further including outer peripheral surfaces dimensioned to be received in said bore with minimal clearance for sliding translation therein, said mold dies being received in said bore in spaced apart relationship to define therebetween a mold cavity; means for processing said plurality of molding assemblies individually and consecutively, including means for injecting a thermoplastic molding material in a molten state into said mold cavity, means for moving said mold dies together to compress said molding material and to squeeze excess molding material from said molding cavity.

11. The apparatus of claim 10, wherein said means for injecting thermoplastic molding material includes an injector port extending through said sleeve to said cavity.

12. The apparatus of claim 11, further including means for translating said mold dies in unison relative to said sleeve to translate said cavity out of communication with said injector port.

13. The apparatus of claim 12, wherein said means for translating said dies in unison comprises first motive means connected to said sleeve.

14. The apparatus of claim 13, wherein said means for urging said mold dies together to compress said molding material comprises second motive means connected to at least one of said mold dies.

15. The apparatus of claim 14, wherein said first and second motive means comprise first and second hydraulically operated pistons, respectively.

16. The apparatus of claim 12, further including an annular groove formed in said bore and disposed in registration with said cavity as said thermoplastic material cools, whereby a peripheral portion of the lens extends into said annular groove and the lens is retained thereby when said mold dies are removed from said bore.

17. The apparatus of claim 12, further including a compound press adapted to selectively urge said dies together and to translate said mold dies in unison relative to said sleeve.

18. The apparatus of claim 17, wherein said compound press includes a support bracket adapted to releasably engage said sleeve, and first hydraulic means for selectively translating said support bracket and said sleeve relative to said mold dies.

19. The apparatus of claim 18, wherein said support bracket includes a pair of spaced side walls having opposed, confronting grooves disposed therein, and said sleeve includes a flange extending therefrom and dimensioned to be slidably received in said confronting grooves.

20. The apparatus of claim 19, wherein said compound press includes means for releasably engaging said mold dies in slidable fashion in the same direction as the orientation of said confronting grooves of said sleeve support bracket.

21. The apparatus of claim 20, wherein each of said dies includes a backing plate, and said means for releasably engaging said mold dies includes gripper means for engaging said backing plates of said dies in releasable fashion.

22. The apparatus of claim 21, further including second hydraulic means disposed to translate reciprocally in the same operational direction as said first hydraulic means, said gripper means inmeans disposed to translate reciprocally in the same operational direction as said first hydraulic means, said gripper means including a gripper member secured to said second hydraulic means and disposed to engage a backing plate of one of said mold dies.

23. The apparatus of claim 19, further including a slot extending into said flange and adapted to be engaged by robot caliper grippers.

24. An apparatus for molding finished ophthalmic lenses, comprising;
   a plurality of molding assemblies, each molding assembly including a sleeve member having a bore extending therein, a pair of mold dies having contoured molding surfaces adapted to form complementary front and back surfaces of a lens, said dies further including outer peripheral surfaces dimensioned to be received in said bore with minimal clearance for sliding translation therein, said mold dies being received in said bore in spaced apart relationship to define therebetween a mold cavity;
   means for processing each of said plurality of molding assemblies in successive fashion, including means for releasably engaging one of said plurality of molding assemblies, means for injecting a molten thermoplastic molding material having a glass transition temperature into said mold cavity, and means for moving said mold dies together to compress said molding material;
   means for thermally cycling said plurality of molding assemblies, including means for heating each of said molding assemblies to a temperature above the glass transition temperature of said molding material prior to being engaged by said means for engagement, and means for cooling each of said molding assemblies after being released by said means for engagement to cool the molding material below the glass forming temperature thereof.

25. An apparatus for molding finished ophthalmic lenses, comprising;
   a plurality of molding assemblies, each molding assembly including a sleeve member having a bore extending therein, a pair of mold dies having contoured molding surfaces adapted to form complementary front and back surfaces of a lens, said dies further including outer peripheral surfaces dimensioned to be received in said bore with minimal clearance for sliding translation therein, said mold dies being received in said bore in spaced apart relationship to define therebetween a mold cavity;
   a mold filling device for processing said plurality of molding assemblies individually and consecutively, including means for releasably engaging each of said plurality of molding assemblies in serial order, means for injecting a molten thermoplastic molding material having a glass transition temperature into said mold cavity, and means for moving said mold dies together to compress said molding material;
   means for thermally cycling said plurality of molding assemblies, including means for heating each of said molding assemblies to a temperature above the glass transition temperature of said molding material prior to being engaged by said mold filling device, and means for cooling each of said molding assemblies below the glass transition temperature while said molding assemblies are disposed externally of said mold filling device.

26. The apparatus of claim 25, wherein said means for heating each of said molding assemblies to a temperature above the glass transition temperature of said molding material is also disposed externally of said mold filling device.

27. The apparatus of claim 25, wherein said means for thermally cycling said plurality of molding assemblies also includes means for maintaining compressive force to urge said mold dies to compress said thermoplastic material while said thermoplastic material cools below the glass transition temperature.

28. The apparatus of claim 25, wherein said means for releasably engaging each of said plurality of molding assemblies further includes means for compressing said dies together and squeezing excess thermoplastic material from said molding cavity.

* * * * *